G. GOETZ.
AUTOMATIC RECORDING CAR SCALE.
APPLICATION FILED MAY 22, 1908.

946,600.

Patented Jan. 18, 1910.
7 SHEETS—SHEET 3.

Fig. 3

Witnesses:
Wm. Geiger
H. W. Munday

Inventor
George Goetz
By Munday, Evarts, Adcock & Clarke
Attorneys

G. GOETZ.
AUTOMATIC RECORDING CAR SCALE.
APPLICATION FILED MAY 22, 1908.

946,600.

Patented Jan. 18, 1910.

Witnesses:
Wm. Geiger
H. M. Munday

Inventor:
George Goetz
By Munday, Evarts, Adcock & Clarke.
Attorneys

UNITED STATES PATENT OFFICE.

GEORGE GOETZ, OF CHICAGO, ILLINOIS, ASSIGNOR TO STREETER-AMET WEIGHING & RECORDING COMPANY, OF CHICAGO, ILLINOIS, A CORPORATION OF ILLINOIS.

AUTOMATIC RECORDING CAR-SCALE.

946,600.

Specification of Letters Patent. Patented Jan. 18, 1910.

Application filed May 22, 1908. Serial No. 434,425.

To all whom it may concern:

Be it known that I, GEORGE GOETZ, a citizen of the United States, residing in Chicago, in the county of Cook and State of Illinois, have invented a new and useful Improvement in Automatic Recording Car-Scales, of which the following is a specification.

My invention relates to improvements in scales for automatically weighing and printing and recording the weights of cars as one or more cars coupled together pass continuously or under motion over the scale platform, both the weighing of the car or cars and the recording of its or their weight being done while the same are in motion.

My invention consists in the novel construction of parts and devices and in the novel combinations of parts and devices herein shown and described, and more particularly specified in the claims.

In the accompanying drawing forming a part of this specification,
Fig. 17 is a section on line 17—17 of Fig. 15.
In the drawing, A represents the platform of a car scale, B the scale beam, C a counterbalance spring, D the type or printing wheel, E the paper ribbon or strip upon which the weight is recorded, F the feed mechanism for the paper ribbon or strip, G the printing hammer, H the dashpot, K the inking disk or device, M the track levers and N the track lever setting device.

The scale platform A is provided with track rails $A^1$ thereon which connect with the rails $A^2$ of the railway track at each end of the scale platform, so that the train of cars may be drawn continuously over the scale platform, and each car in succession weighed and its weight recorded while under motion or moving over the platform.

The scale beam B is furnished with one or more counterbalance weights $B^1$ for use in balancing the scale. It is connected with the scale levers beneath them and upon which the scale platform rests by suitable connecting links and levers $B^2$ $B^3$ $B^4$. The scale beam B is further provided with an extension $B^5$ connected with the piston stem $h$ of the dashpot H. The scale beam B is further connected through suitable connecting links or clevises $b$ $b^1$ $b^2$ and racks $b^4$ with the counterbalance spring C. The counterbalance spring C is provided with tension adjusting devices $C^1$ $C^2$.

Figures 14, 15, 16:
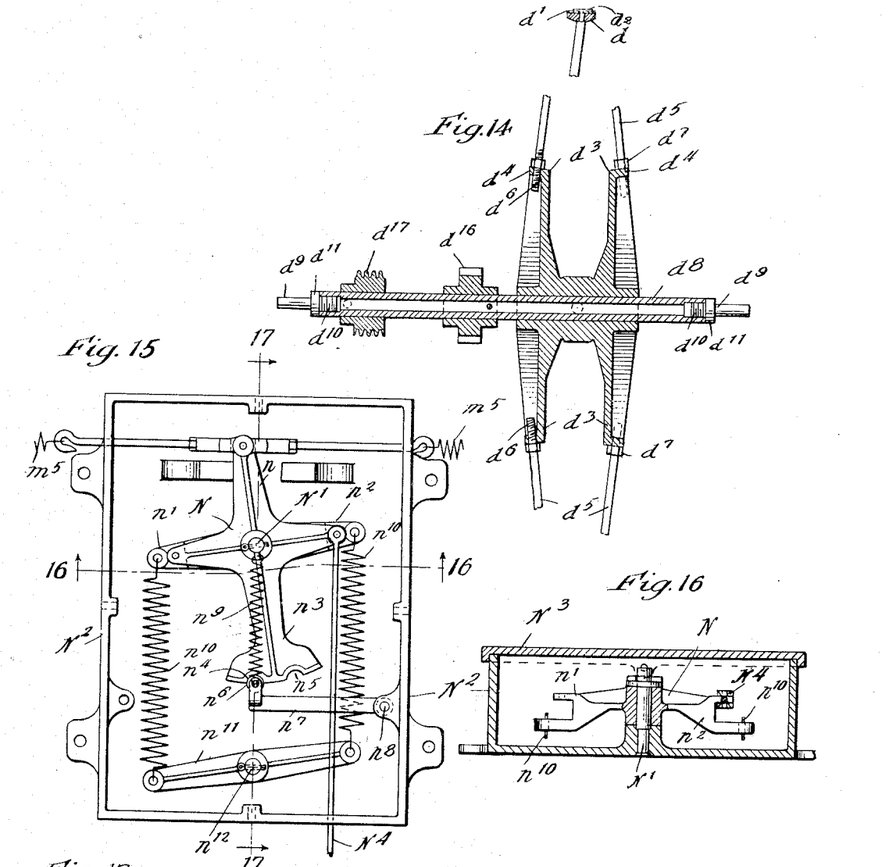
Fig. 14 is a detail section of the type wheel or weight printing wheel.
Fig. 15 is a detail plan view of the track lever setting mechanism.
Fig. 16 is a section on line 16—16 of Fig. 15
Figure 17:
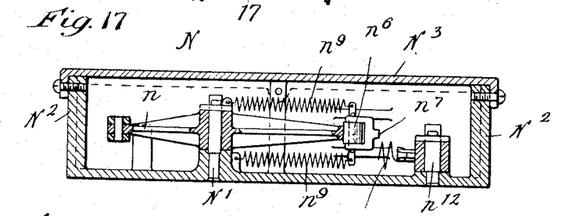

The type wheel D has a metallic rim $d$, a type rim $d^1$ furnished with type $d^2$, a double rimmed hub $d^3$, each having lateral flanges $d^4$ to receive the threaded and adjustable spokes $d^5$ which are furnished with screw threads $d^6$ and nuts $d^7$. The double rimmed hub $d^3$ of the type wheel is secured to a hollow rotatable shaft $d^8$ which is furnished at each end with solid bearing spindles $d^9$ having threaded ends $d^{10}$ and collars $d^{11}$. The type wheel spindles $d^9$ are thus solid and very much reduced in diameter in respect to the shaft $d^8$. The spindles of the type wheel shaft are journaled or supported at each end upon a pair of anti-friction wheels $d^{12}$ $d^{12}$, the shaft $d^{13}$ of each of which is in turn journaled upon a pair of anti-friction wheels or rollers $d^{14}$, the shafts $d^{15}$ of which are journaled on the frame of the machine. By this construction and journaling of the type wheel, I am enabled to make it very true in shape, very light in weight and to reduce the friction of its turning to a minimum so that no appreciable inaccuracy in weighing can result. The type wheel shaft

$d^8$ is furnished with a spur gear $d^{16}$ which meshes with the rack $b^4$ which constitutes one of the connecting links between the scale beam B and the counterbalance spring C. The type wheel shaft $d^8$ is further provided with a groove pulley $d^{17}$ carrying a cord or line $d^{18}$ and a counterbalance weight $d^{19}$, which counterbalances or neutralizes the force required to move the type wheel and takes up back lash and insures a more sensitive and accurate action of the type wheel in responding to the weight of the car being weighed.

Figure 1:
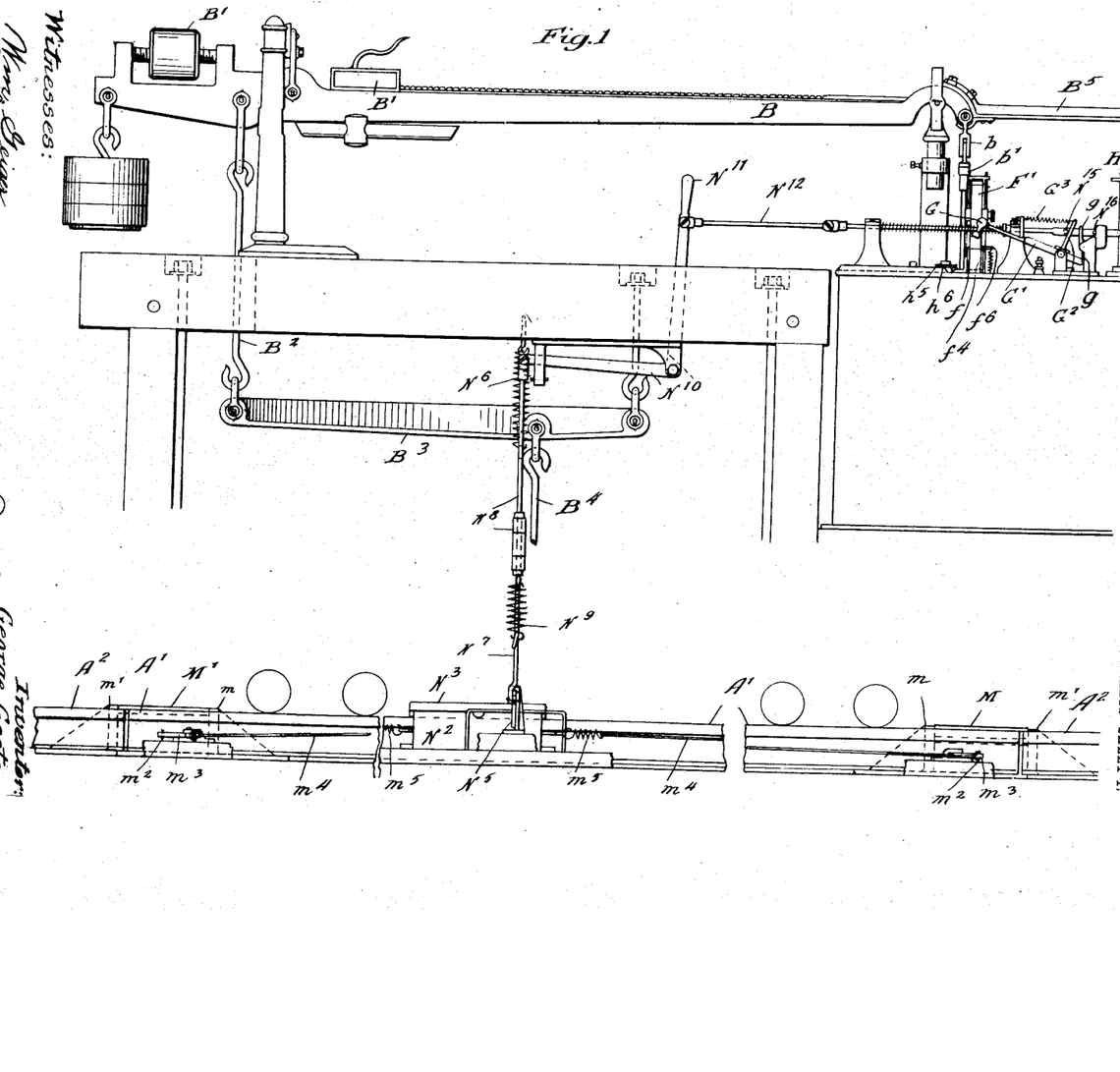
Figure 1 is a side elevation of a car weighing and weight printing or recording scale embodying my invention.
Figure 2:
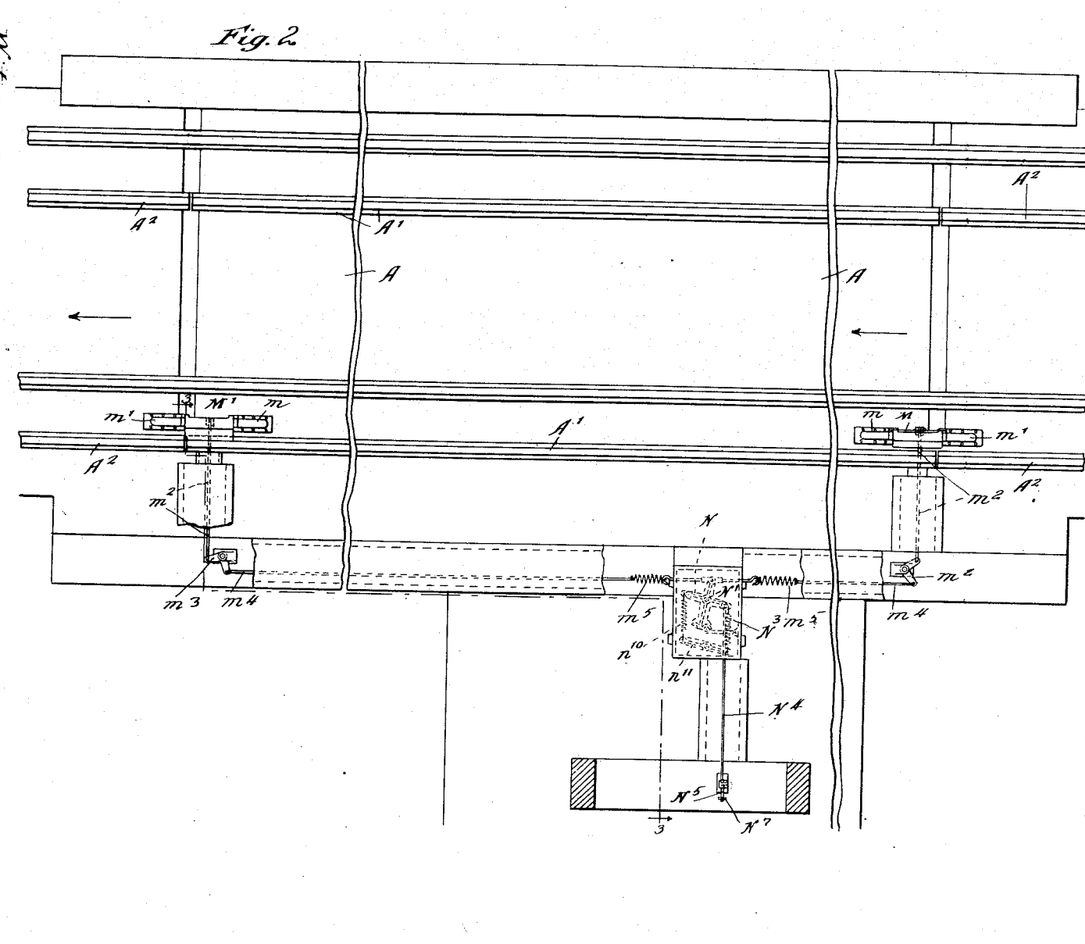
Fig. 2 is a detail plan view partly in horizontal section showing the car scale platform and other parts.
Figure 3:
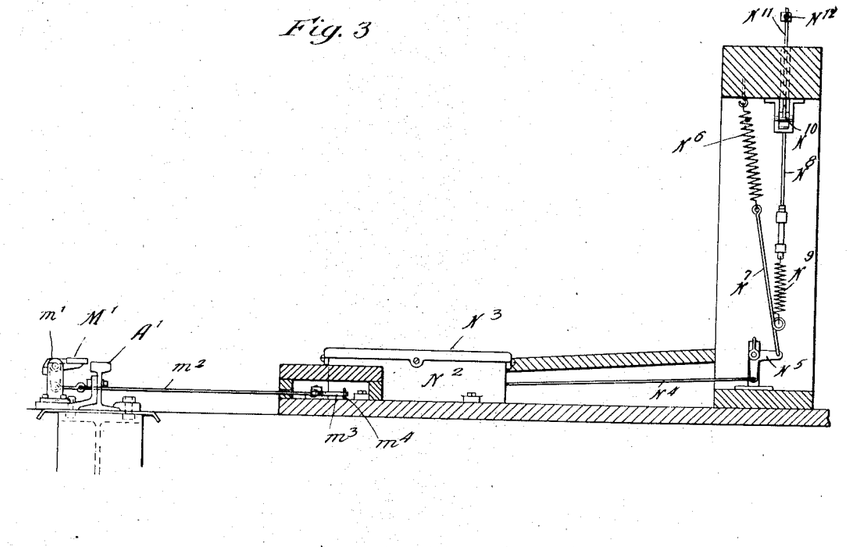
Fig. 3 is a vertical section on the broken line 3—3 of Fig. 2.
Figure 4:
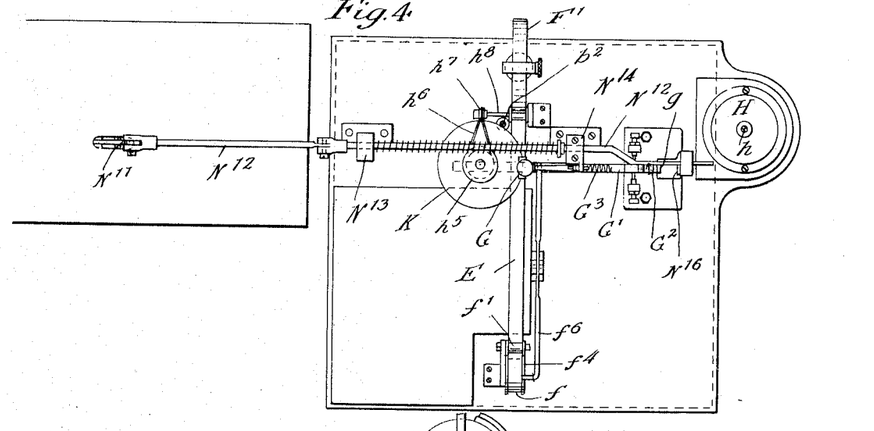
Fig. 4 is a detail plan view of certain parts of the weighing and recording mechanism.
Figure 5:
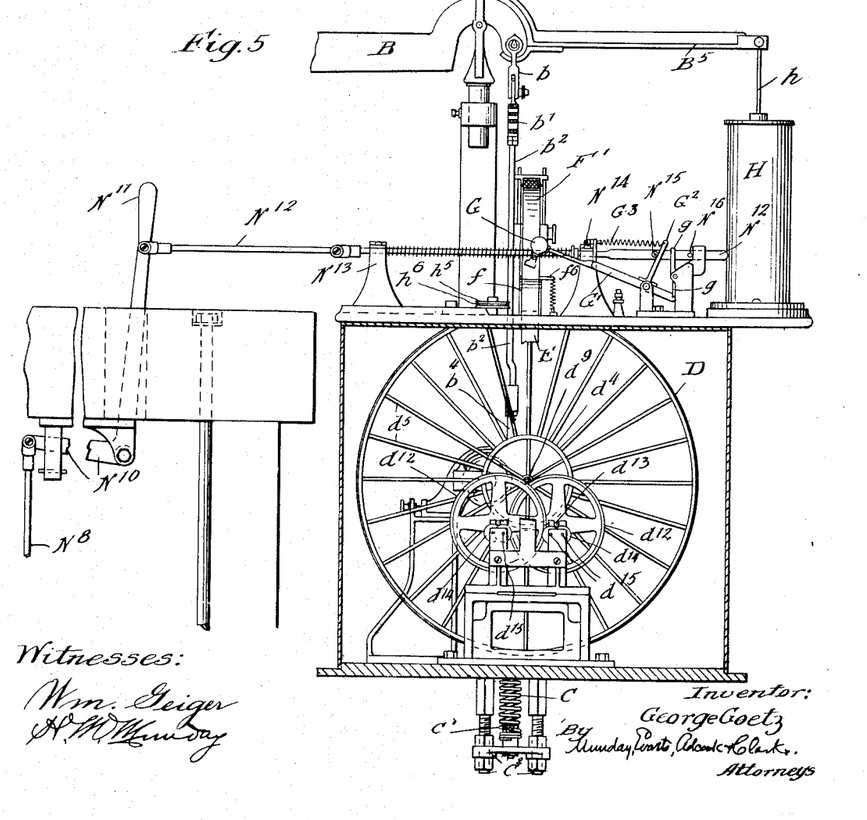
Fig. 5 is a detail elevation partly in vertical section.
Figures 6, 7, 8, 9, 10:
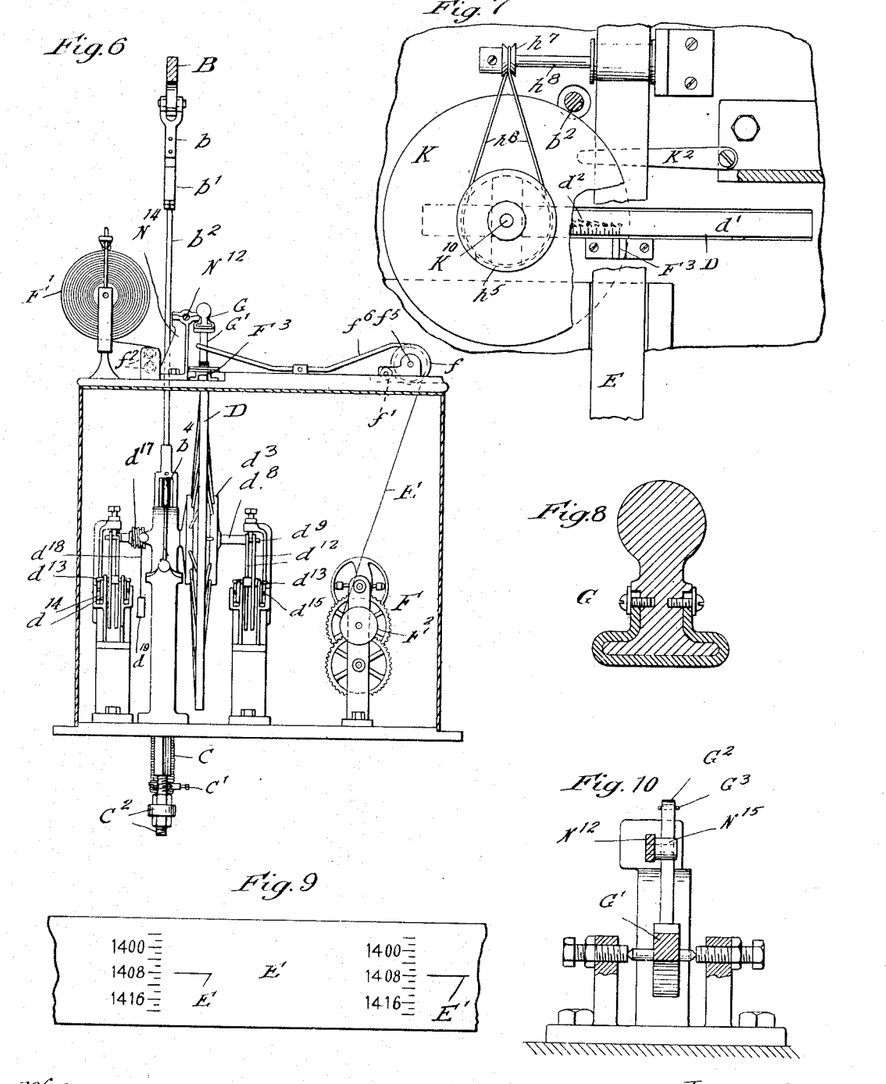
Fig. 6 is a detail front elevation of the weight printing wheel and other parts.
Fig. 7 is a detail plan view showing portions of the weight printing mechanism.
Fig. 8 is a detail section of the printing mechanism on line 8—8 of Fig. 11.
Fig. 9 is a detail plan view showing a portion of the paper ribbon upon which the weight is printed or indicated.
Fig. 10 is a detail section on line 10—10 of Fig. 11 showing the printing hammer lever.
Figure 11:
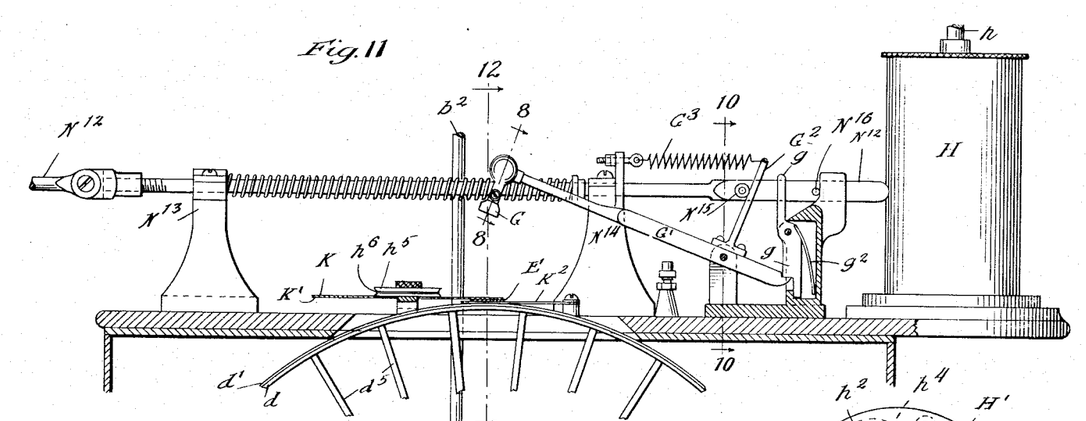
Fig. 11 is a detail elevation of the weight printing mechanism, partly in vertical section.

The paper strip or ribbon E upon which the weight of each car is printed or recorded as the train of cars pass continuously over the scale platform B, is automatically fed by a spring motor or feed device F, from the reel or spool $F^1$ to the take up spool $F^2$, the paper strip passing over and around the guide spools $f$ $f^1$ $f^2$ and over the upper portion of the type wheel D and the stationary pointer type $F^3$. The pointer type $F^3$ simply prints a straight line or indicator mark $E^1$ on the paper strip or ribbon E, while the type wheel D prints the numerals of the figures representing hundreds of pounds. The indicator mark $E^1$ thus printed on the type wheel bodies related to the numerals printed on the paper strip by the type wheel indicates the true weight of the car in hundreds of pounds. Ordinarily, I prefer to have the type on the type wheel only print each even hundred pounds, the intervening odd hundred pounds being omitted from the type wheel, as will be readily understood from Fig. 9 of the drawing, which represents a portion of the paper strip as printed by the type wheel and pointer type $F^3$. The spring or other motor F keeps the paper strip E normally under tension, so that the moment the notched disk $f^4$ on the shaft $f^5$ of the guide roller $f$ is released by its spring pawl lever $f^6$ by the depression of the printing hammer G, the paper strip or ribbon will be automatically fed forward the required distance.

The printing hammer G is mounted on a lever $G^1$ having an arm $G^2$ furnished with a spring $G^3$ which actuates the printing hammer to strike the required blow the instant the printing hammer lever is released by the track lever operated trigger or pawl $g$ which holds the printing hammer in its raised position ready to print the weight of the car.

Figures 12, 13:
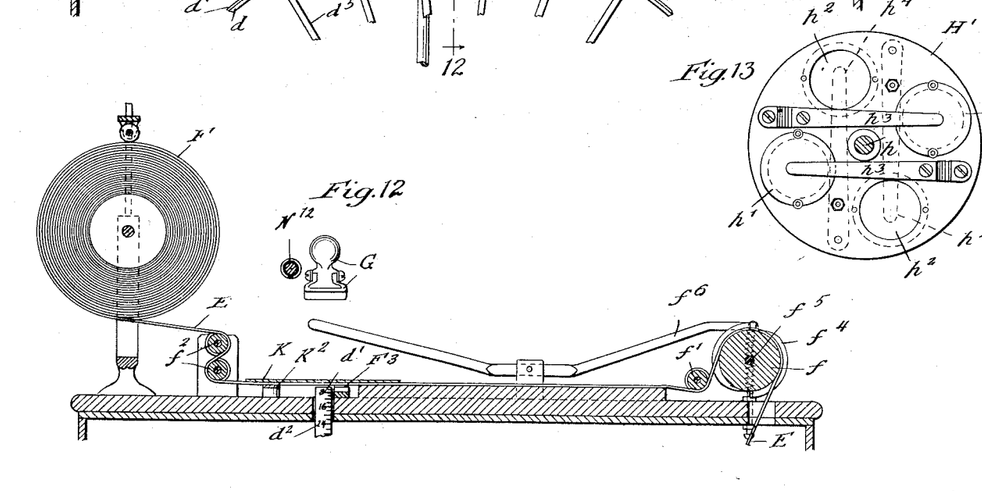
Fig. 12 is a section on line 12—12 of Fig. 11.
Fig. 13 is a detail plan view of the dash-pot piston and valve mechanism.

The piston $H^1$ of the dashpot H is furnished with a plurality of upwardly opening valves $h^1$ and a plurality of downwardly opening valves $h^2$, furnished with light flat springs $h^3$ $h^4$, each pair of valves being of graduated strength or tension. The dashpot thus acts with great delicacy and precision in steadying the movement of the scale beam and of the type wheel actuated thereby, and thus insures accuracy of weighing and causes the brake beam to quickly come to a true balance as each car passes over the scale platform.

The inking or printing disk K is preferably furnished with a carbon paper $K^1$ on its under face to cause the type of the type wheel D and indicator type $F^3$ to make a distinct print or impression on the paper strip E. The printing disk K has a shaft or stud $K^{10}$ and it is turned or rotated by the friction of the paper strip or tape E against it as said paper strip feeds forward. A guide spring $K^2$ compresses the paper strip against the rotatable printing disk K so as to cause the printing disk to turn and thus bring a new printing surface into printing position for each impression. This causes the printing disk and paper to move together and prevents the smearing of the paper strip by the printing disk.

The printing disk is rotated by a belt $h^6$ passing around a wheel $h^5$ on the shaft $K^{10}$ of the printing disk K and around a wheel $h^7$ on the shaft $h^8$ of the paper strip guide roller $f^2$.

Two track levers M $M^1$ are employed, one at each end of the scale platform, each of bail form, and having one end journaled in a suitable bearing or fulcrum piece $m$ on the scale platform and the other end journaled in a like bearing or fulcrum piece $m^1$ on the stationary frame $A^3$ at the end of the scale platform. Each of the track levers M $M^1$ is connected by a link $m^2$, bent lever $m^3$ and link $m^4$ furnished with springs $m^5$ with a track lever setting or adjusting device N fulcrumed at $N^1$ to an inclosing case or box $N^2$ which is furnished with a removable cover $N^3$. The setting or adjusting device N is provided with four arms $n$ $n^1$ $n^2$ $n^3$, and the latter arm $n^3$ is provided with two notches $n^4$ $n^5$, adapted to be engaged by a roller $n^6$ on a pivoted locking arm or link $n^7$ which is hinged at $n^8$ to the box or case $N^2$ and which is held in engagement with the setting device N by springs $n^9$. The two arms $n^1$ and $n^2$ of the track lever setting device N are connected by springs $n^{10}$ with a vibrating arm or lever $n^{11}$, the pivot shaft $n^{12}$ of which is mounted in the box or case $N^2$. The springs $n^{10}$ keep the setting device N under tension so that it will not be accidentally moved by the jarring or jolting movement of the cars or train passing over the track rails $A^1$ $A^2$. The arm $n^2$ of the track lever setting device N is connected by a link $N^4$ with a bent lever $N^5$ held in normal position by a spring $N^6$ and connected by links $N^7$ $N^8$ and spring $N^9$, lever $N^{10}$ having handle $N^{11}$ and connecting rod $N^{12}$ with the impression hammer G and its trigger $g$. The connecting rod $N^{12}$ is supported in suitable guides $N^{13}$ $N^{14}$ on the frame, and it is provided with a pin or projection $N^{15}$ adapted to engage the arm $G^2$ of the impression hammer lever $G^1$, and also with a pin or projection $N^{16}$ adapted to engage the trigger $g$ by which the impression hammer lever is held in its raised position. Through the pin or projection $N^{15}$, the track lever M serves to raise the impression hammer into its elevated position ready for making the impression, and through the pin or projection $N^{16}$ the track lever $M^1$ also automatically operates the impression hammer trigger $g$ to release the impression hammer. By operating the connecting lever $N^{10}$ through its handle $N^{11}$, the operator can set the impression hammer by hand and also operate by hand the track levers to see that they are in position for proper operation after engines, cars or trucks pass over the scale platform. The impression hammer trigger $g$ is held in normal position by a spring $g^2$.

One, two or more cars capable of being accommodated or received simultaneously on the scale platform are passed over the scale platform at a speed of several miles per hour. The first wheel which strikes the first track lever M by depressing said first track lever causes it, through its connecting mechanism, to raise the impression hammer G and then the trigger $g$ holds the impression hammer in its raised position ready for printing the weight. After the first wheel of the car or cars thus actuates the first track lever M, the remaining wheels of the car or cars pass over said track lever M without causing any further operation of the mechanism. Then after all the wheels of the car or cars are on the scale platform, the first or advance wheel of the car or cars by depressing the second track lever $M^1$, automatically actuates through its connecting mechanism the impression hammer trigger $g$ to release the impression hammer lever and thus cause the true weight of the car or cars on the scale platform to be impressed or printed on the paper strip or ribbon E. After the impression hammer is thus released and the weight of the car or cars printed, the remaining wheels of the car or cars pass over the second track lever $M^1$ without causing any further operation of the mechanism. My improved car scale for weighing cars under motion is specially designed and intended for weighing two or more cars at a time, such, for example, as cars upon which long steel beams or rails are loaded, the scale platform being ordinarily made a hundred feet, or such matter, in length so as to accommodate two or more cars at a time thereon.

After the setting or locking lever N is operated by one of the track levers M or $M^1$, the pawl or locking device $n^7$ holds said setting lever or device N in the position to which it is moved by said one track lever until said setting device N is again moved by the other track lever.

While my improved car scale is specially designed and intended for weighing two or more cars simultaneously, it may also of course be used for weighing a single car.

I claim:—

1. In an automatic weight recording car scale for weighing one or more cars under motion, the combination with a scale platform and scale beam connected therewith, a counterbalance spring and type wheel connected with said scale beam, and impression hammer and impression hammer lever for striking said type wheel, and a releasing trigger for the impression hammer lever, of two track levers, one near each end of the scale platform adapted to be operated by the car wheels and connecting mechanism between said track levers and said impression hammer lever and releasing trigger, both said track levers being operated by the front wheel of the car, the one to raise the impression hammer lever and the other to release it whereby the impression hammer lever is raised by depression of the track lever near the entering end of the scale platform and said releasing trigger operated by said track lever near the exit end of the scale platform, substantially as specified.

2. In an automatic weight recording car scale for weighing one or more cars under motion, the combination with a scale platform and scale beam connected therewith, a counterbalance spring and type wheel connected with said scale beam, and impression hammer and impression hammer lever for striking said type wheel, and a releasing trigger for the impression hammer lever, of two track levers, one near each end of the scale platform adapted to be operated by the car wheels and connecting mechanism between said track levers and said impression hammer lever and releasing trigger, both said track levers being operated by the front wheel of the car, the one to raise the impression hammer lever and the other to release it whereby the impression hammer lever is raised by depression of the track lever near the entering end of the scale platform and said releasing trigger operated by said track lever near the exit end of the scale platform, said connecting mechanism having a setting lever furnished with notches and a locking pawl, substantially as specified.

3. In an automatic weight recording car scale for weighing one or more cars under motion, the combination with a scale platform and scale beam connected therewith, a counterbalance spring and type wheel connected with said scale beam, and impression hammer and impression hammer lever for striking said type wheel, and a releasing trigger for the impression hammer lever, of two track levers, one near each end of the scale platform adapted to be operated by the car wheels and connecting mechanism between said track levers and said impression hammer lever and releasing trigger, whereby the impression hammer lever is raised by depression of the track lever near the entering end of the scale platform and said releasing trigger operated by said track lever near the exit end of the scale platform, said connecting mechanism having a locking or setting lever X furnished with notches $n^5$, a locking pawl $n^7$ furnished with roller $n^6$ and spring $n^9$, substantially as specified.

4. In a car scale, the combination with a scale platform furnished with track rails, two track levers adjacent to said rails one near each end of the scale platform, a scale beam and type wheel actuated thereby, an impression hammer, impression hammer lever and releasing trigger therefor and a connecting mechanism between said track levers, said impression hammer and releasing trigger, said connecting mechanism having a four-arm setting lever connected at one arm with both of the track levers, a locking pawl or dog engaging one arm of said setting lever, a supplemental lever and springs connecting two of the arms of said setting lever with said supplemental lever, substantially as specified.

5. In a car scale, the combination with a scale platform having track rails thereon, of a track lever near each end of the scale platform and adjacent to one of the track rails, a setting lever furnished with two notches, a locking pawl, and connections between one arm of said setting lever and both of said track levers, substantially as specified.

6. In a car scale, the combination with a scale platform having track rails thereon, of a track lever near each end of the scale platform and adjacent to one of the track rails, a setting lever furnished with two notches, a locking pawl, and connections between one arm of said setting lever and both of said track levers, said connections to each of said track levers being furnished with springs, substantially as specified.

7. In a car scale, the combination with a scale platform having track rails thereon, of a track lever near each end of the scale platform and adjacent to one of the track rails, a setting lever furnished with two notches, a locking pawl, and connections between one arm of said setting lever and both of said track levers, said connections to each of said track levers being furnished with springs, a supplemental lever, and springs connecting said supplemental lever with said setting lever, substantially as specified.

8. In a car scale, the combination with a scale platform having track rails thereon, of a track lever near each end of the scale platform and adjacent to one of the track rails, a setting lever furnished with two notches, a locking pawl, and connections between one arm of said setting lever and both of said track levers, said connections to each of said track levers being furnished with springs, a supplemental lever and springs connecting said supplemental lever with said setting lever, said locking pawl having an anti-friction roller for engagement with the notches of said setting lever, substantially as specified.

9. In a car scale, the combination with a scale platform having track rails thereon, of a track lever near each end of the scale platform and adjacent to one of the track rails, a setting lever furnished with two notches, a locking pawl, and connections between one arm of said setting lever and both of said track levers, said connections to each of said track levers being furnished with springs, a supplemental lever and springs connecting said supplemental lever with said setting lever, said locking pawl having an anti-friction roller for engagement with the notches of said setting lever, a scale beam and means connecting it with said scale platform, a type wheel connected with said scale beam, an impression hammer, impression hammer lever and releasing trigger therefor and connections between said setting lever and said impression hammer lever and releasing trigger, substantially as specified.

10. In a car scale, the combination with a scale platform having track rails thereon, of a track lever near each end of the scale platform and adjacent to one of the track rails, a setting lever furnished with two notches, a locking pawl, and connections between one arm of said setting lever and both of said track levers, said connections to each of said track levers being furnished with springs, a supplemental lever and springs connecting said supplemental lever with said setting lever, said locking pawl having an anti-friction roller for engagement with the notches of said setting lever, a scale beam connected with said scale platform, a type wheel connected with said scale beam, an impression hammer, impression hammer lever and releasing trigger therefor and connections between said setting lever and said impression hammer and release trigger, and a spring for actuating said impression hammer lever when released by said trigger, substantially as specified.

11. In a railway car scale, the combination with a scale beam, and counterbalance spring, dashpot and type wheel connected with said scale beam, a stationary pointer mark type adjacent to said type wheel, and an impression hammer for striking said type wheel and pointer mark type, and a releasing trigger for said impression hammer of a scale platform having track rails thereon, two track levers adjacent to one of said track rails one near each end of the scale platform, a setting lever having notches, a locking pawl furnished with a spring and adapted to engage the notches of the setting lever, connections between said setting lever and both of said track levers, and connecting means between said setting lever and said impression hammer lever and releasing trigger, substantially as specified.

12. In a railway car scale, the combination with a scale beam, and counterbalance spring, dashpot and type wheel connected with said scale beam, a stationary pointer mark type adjacent to said type wheel, and an impression hammer for striking said type wheel and pointer mark type, and a releasing trigger for said impression hammer of a scale platform having track rails thereon, two track levers adjacent to one of said track rails one near each end of the scale platform, a setting lever having notches, a locking pawl furnished with a spring and adapted to engage the notches of the setting lever, connections between said setting lever and both of said track levers, and connecting means between said setting lever and said impression hammer lever and releasing trigger, the operation of said setting lever by the track lever at the entrance end of the scale platform serving to raise the impression hammer and the operation of said setting lever by the track lever at the exit end of the scale platform serving to release said trigger, substantially as specified.

13. In a railway car scale, the combination with a scale beam, and counterbalance spring, dashpot and type wheel connected with said scale beam, a stationary pointer mark type adjacent to said type wheel, and an impression hammer for striking said type wheel and pointer mark type, and a releasing trigger for said impression hammer of a scale platform having track rails thereon, two track levers adjacent to one of said track rails one near each end of the scale platform, a setting lever having notches, a locking pawl furnished with a spring and adapted to engage the notches of the setting lever, connections between said setting lever and both of said track levers, and connecting means between said setting lever and said impression hammer lever and releasing trigger, the operation of said setting lever by the track lever at the entrance end of the scale platform serving to raise the impression hammer and the operation of said setting lever by the track lever at the exit end of the scale platform serving to release said trigger, and a spring for actuating the impression hammer when released by said trigger, substantially as specified.

14. In a railway car scale, the combination with a scale beam, and counterbalance spring, dashpot and type wheel connected with said scale beam, a stationary pointer mark type adjacent to said type wheel, and an impression hammer for striking said type wheel and pointer mark type, and a releasing trigger for said impression hammer of a scale platform having track rails thereon, two track levers adjacent to one of said track rails one near each end of the scale platform, a setting lever having notches, a locking pawl furnished with a spring and adapted to engage the notches of the setting lever, connections between said setting lever and both of said track levers, and connecting means between said setting lever and said impression hammer lever and releasing trigger, the operation of said setting lever by the track lever at the entrance end of the scale platform serving to raise the impression hammer and the operation of said setting lever by the track lever at the exit end of the scale platform serving to release said trigger, a spring for actuating the impression hammer when released by said trigger and a paper strip feed mechanism, substantially as specified.

15. In a railway car scale, the combination with a scale beam, and counterbalance spring, dashpot and type wheel connected with said scale beam, a stationary pointer mark type adjacent to said type wheel, and an impression hammer for striking said type wheel and pointer mark type, and a releasing trigger for said impression hammer of a scale platform having track rails thereon, two track levers adjacent to one of said track rails one near each end of the scale platform, a setting lever having notches, a locking pawl furnished with a spring and adapted to engage the notches of the setting lever, connections between said setting lever and both of said track levers, and connecting means between said setting lever and said impression hammer lever and releasing trigger, the operation of said setting lever by the track lever at the entrance end of the scale platform serving to raise the impression hammer, and the operation of said setting lever by the track lever at the exit end of the scale platform serving to release said trigger, a spring for actuating the impression hammer when released by said trigger, a paper strip feed mechanism for feeding a paper strip between said type wheel and impression hammer and a printing disk interposed between said type wheel and said impression hammer, substantially as specified.

GEORGE GOETZ.

Witnesses:
H. M. MUNDAY,
PEARL ABRAMS.